April 18, 1939.　　　M. F. ZIEHM　　　2,154,714
TRAIL FINDER
Filed July 18, 1938　　　2 Sheets—Sheet 2
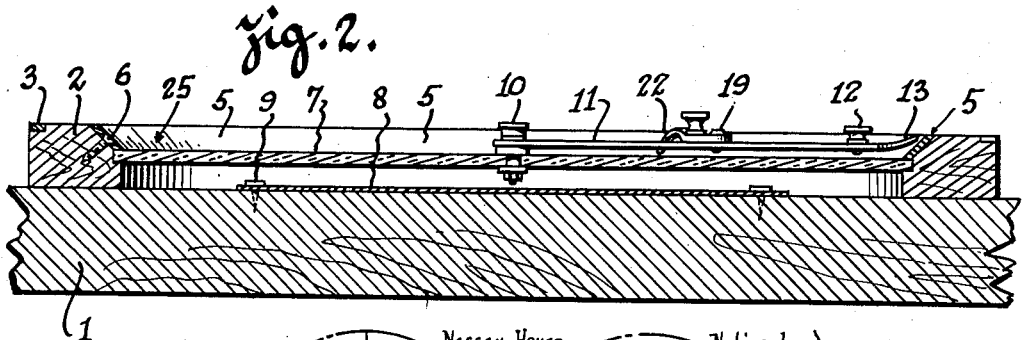
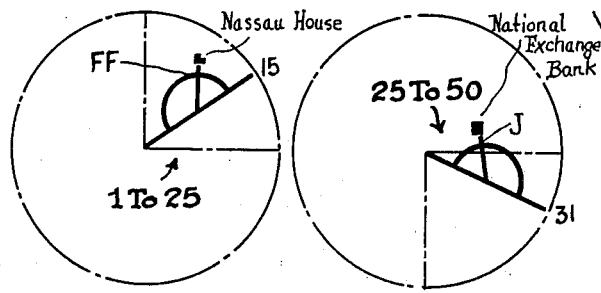
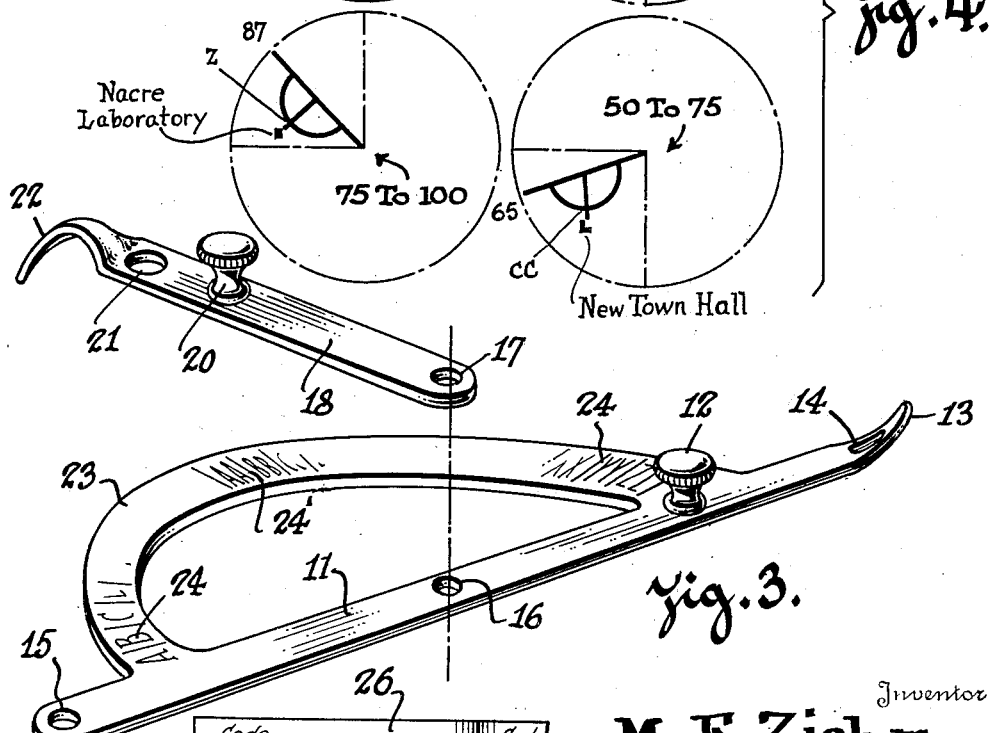

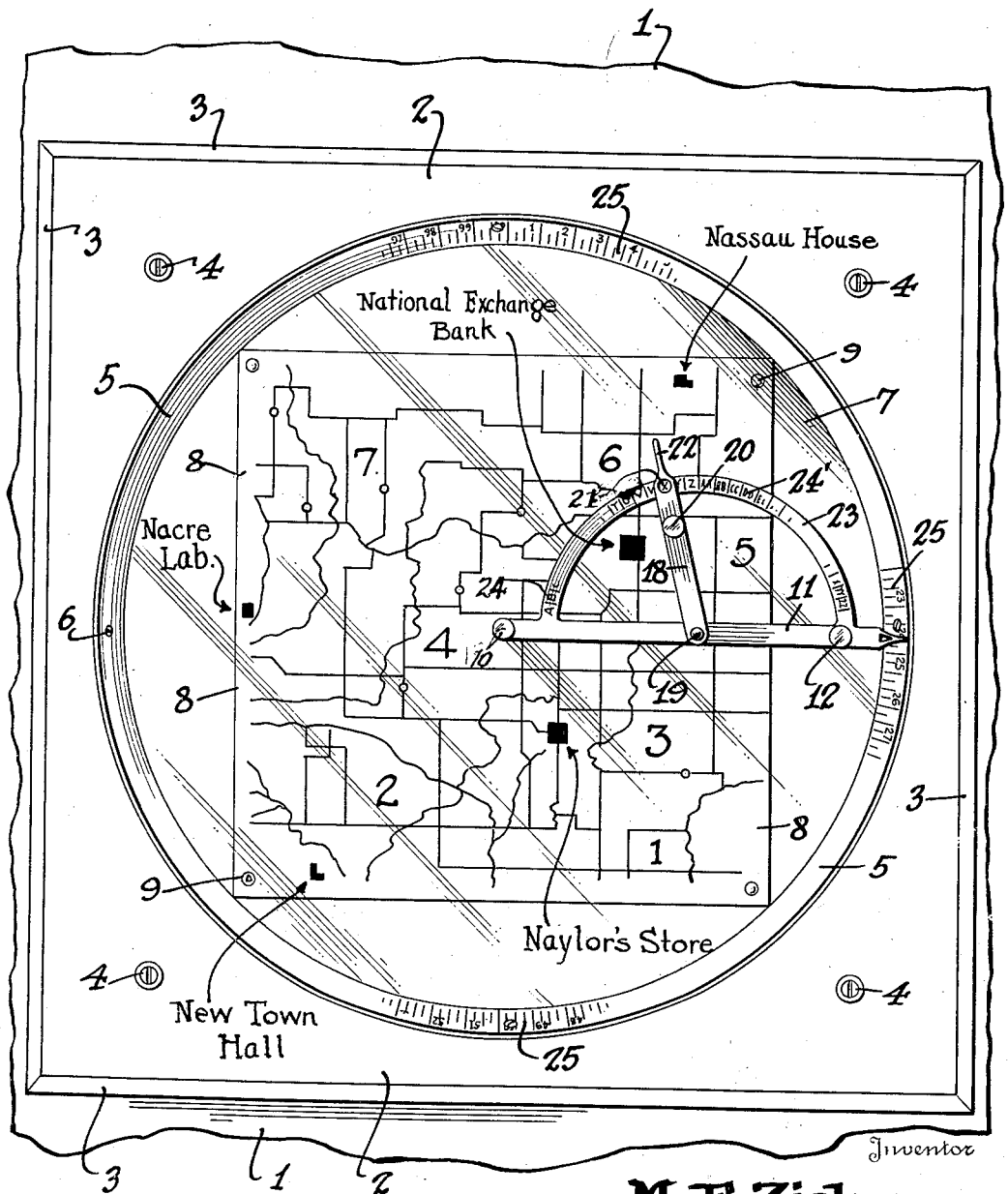

Patented Apr. 18, 1939

2,154,714

UNITED STATES PATENT OFFICE 2,154,714

TRAIL FINDER

Marvin F. Ziehm, Hortonville, Wis., assignor to Rural Fire Apparatus Co., Inc., Hortonville, Wis.

Application July 18, 1938, Serial No. 219,916

12 Claims. (Cl. 33—76)

The object of my invention is to provide a mechanical device to be used in connection with maps showing the Federal, State, county, and township roads and also the various townships and places and points of interest, and means for locating particular points on the maps and ascertaining the distance to reach them.

Another object of my invention is to provide a code book in which the different points such as cities, townships or other points of interest are located on the map by a code number.

Another object of my invention is to provide novel means in connection with such a map to locate and determine the distance between given points.

I attain these and other objects of my invention by the mechanism illustrated in the accompanying drawings, in which—

Figure 1 is a top plan view of the invention;

Fig. 2 is a transverse section through same;

Fig. 3 is a perspective view of the half-moon indicator on the pivoted pointer 18 detached from each other; and Fig. 4 is a diagrammatic view of the apparatus in various positions for determining the distance between specified points.

Fig. 5 is a perspective view of a page of the code book, a portion being broken away for lack of space.

Like numerals designate like parts in each of the several views.

Referring to the accompanying drawings, a table or wall is provided on which the device and map may be mounted. The frame 2 preferably has a metal border strip 3, and is secured to the table or wall by suitable means such as screws 4. The frame 2 has a circular preferably beveled opening on which is mounted a preferably beveled dial ring 5, having suitable numerical markings, numbered consecutively from 1 to 100. The frame has a glass face 7 covering the opening and under which is positioned the map 8, which is suitably secured to the table or wall, as by the thumb tacks 9.

Centrally mounted in the glass face is a center post 10 on which is pivotally mounted the main pointer arm 11, the post 10 extending through the aperture 15 in the shank of the pointer arm 11. The operating knob 12 is affixed to the pointer arm 11, as shown. This pointer arm 11 terminates in an upturned end 13 in which is located the sight opening 14 near the tip of the pointer.

Near the central portion of the pointer arm 11 and midway between the ends of the half-moon or semi-circular dial 23 is an aperture 16. A shorter pointer arm 18 is provided, having an aperture 17 in its shank to seat over the aperture 16 of pointer arm 11. Arm 18 is pivotally connected to pointer arm 11 by a rivet or other pivot member 19. A knob 20 is affixed near the free end of pointer arm 18 for convenience in operating it. The pointer arm 18 has a sight opening 21. The free end of the pointer arm 18 terminates in a downturned pointer 22.

As shown in Figs. 1 and 4, a semi-circular dial 23 is attached to or formed integral with pointer arm 11 and is provided with alphabetical markings 24 extending over an arc of 90° and double alphabetical markings 24' extending over the succeeding arc of 90°.

I provide a novel code book for use in connection with my device having a code designation for each of the geographical points of interest on the particular map, a portion of a page of this code book being illustrated in Fig. 5 of the drawings.

The apparatus is intended for the use of fire departments in rural territory, sheriff's departments, highway officers, townships and villages. The map, for example, may be a map of a particular county showing the Federal State and county township roads and the various townships, or important points of interest, all of which are listed on the map at various locations, such as the main bridges, schools, churches and farm houses. All places thus indicated on the map are in turn alphabetically listed in the code book, together with the code number consisting of a letter or letters and numeral, by reference to which they may be located on the map. Thus if the main pointer arm 11 were moved to the numeral 1 on the dialing 5, and the small pointer 18 was moved so that the sight opening 21 would be over the letter "T", the pointer would point to the square which is named in Figs. 1 and 4 as "National Exchange Bank." This particular building would be listed in the code book as J-31. As another illustration, if the main pointer arm 11 were set to point to the numeral 15 on the dial ring 5 and the smaller pointer set so that its sight opening 21 will rest over the letters FF of the double alphabetical markings 24' on the semi-circular dial 23, the pointer would point to the place designated as "Nassau House" in Figs. 1 and 4; or if the main pointer arm was set to point to 65 and the shorter pointer was set to point to the letters CC, the short pointer would indicate the point of interest designated as "New Town Hall" in Figs. 1 and 4. This point of interest would also be listed in the code book as CC-65. The other geographical points of interest may be located in a similar manner by reference to the code designation and by operating the two pointer arms in the manner described.

If an emergency call is received by the sheriff's department or a fire department on account of a fire or accident or other emergency call, the party receiving the call would refer to his code book in which the geographical points of interest are alphabetically listed, and having found the code number would then go to his map and swing the pointer until it points to the number on the dial, after which he would swing the short pointer until it points to the appropriate letter on the semi-circular dial, which would at once show him the exact spot where the place was located. He could then direct his men to proceed at once over the nearest route to the exact point without losing any time, from whatever place the men might be located or from a central station in the county.

After every point of interest that it may be desired to locate is listed in the code book, and given a definite code number, such points of interest can be located and referred to with this device in less than thirty seconds. Valuable time is thus saved by a fire department or sheriff's office using this device.

What I claim is:

1. In a trail finder adapted to be placed over a map for determining distances between points on the map, the combination of a frame having an opening therein through which a map is visible and over which the frame is centered, a glass face covering said opening, a beveled dial ring encircling said opening and bearing a series of successive numerals, a central post mounted in the glass face, a pointer arm having its shank pivotally mounted on said post, a semicircular dial formed integral with the pointer arm and bearing a plurality of alphabets, a second pointer arm pivotally mounted on the first pointer arm midway of the ends of the semicircular dial, said pointer arm having a sight opening positioned over the letters on the semi-circular dial and a downturned pointed end formed on said arm.

2. In a trail finder adapted to be placed over a map for determining distances between points on the map, the combination of a frame having an opening therein through which a map is visible and over which the frame is centered, a beveled dial ring encircling said opening and bearing a series of successive numerals, a central post, a pointer arm having its shank pivotally mounted on said post, a semi-circular dial formed integral with the pointer arm and bearing a plurality of alphabets, a second pointer arm pivotally mounted on the first pointer arm midway of the ends of the semi-circular dial, said pointer arm having a sight opening positioned over the letters on the semi-circular dial and a downturned pointed end formed on said arm.

3. In a trail finder adapted to be placed over a map for determining distances between points on the map, the combination of a frame having an opening therein through which a map is visible and over which the frame is centered, a glass face covering said opening, a dial ring encircling said opening and bearing a series of successive numerals, a central post mounted in the glass face, a pointer arm having its shank pivotally mounted on said post, a semi-circular dial formed integral with the pointer arm and bearing a plurality of alphabets, a second pointer arm pivotally mounted on the first pointer arm midway of the ends of the semi-circular dial, said pointer arm having a downturned pointed end formed on said arm.

4. In a trail finder adapted to be placed over a map for determining distances between points on the map, the combination of a frame having an opening therein through which a map is visible and over which the frame is centered, a glass face covering said opening, a beveled dial ring encircling said opening and bearing a series of numerals, a central post mounted in the glass face, a pointer arm having its shank pivotally mounted on said post, a semi-circular dial formed integral with the pointer arm and bearing a plurality of alphabets, a second pointer arm pivotally mounted on the first pointer arm midway of the ends of the semi-circular dial, said pointer arm having a sight opening positioned over the letters on the semi-circular dial and a downturned pointed end formed on said arm.

5. In a trail finder adapted to be placed over a map for determining distances between points on the map, the combination of a frame having an opening therein through which a map is visible and over which the frame is centered, a glass face covering said opening, a beveled dial ring encircling said opening and bearing a series of numerals, a central post mounted in the glass face, a pointer arm having its shank pivotally mounted on said post, a semi-circular dial constituting an extension of the pointer arm and bearing a plurality of alphabets, a second pointer arm pivotally mounted on the first pointer arm midway of the ends of the semi-circular dial, said pointer arm having a sight opening positioned over the letters on the semi-circular dial and a pointed end formed on said arm.

6. In a trail finder adapted to be placed over a map for determining distances between points on the map, the combination of a frame having an opening therein through which a map is visible and over which a frame is centered, a glass face covering said opening, a beveled dial ring encircling said opening and bearing a series of successive numerals, a central post mounted in the glass face, a pointer arm having its shank pivotally mounted on said post, a semi-circular dial formed integral with the pointer arm and bearing successive letters, a second pointer arm pivotally mounted on the first pointer arm midway of the ends of the semi-circular dial, said pointer arm having a sight opening positioned over the letters on the semi-circular dial and a downturned pointed end formed on said arm.

7. In a trail finder adapted to be placed over a map for determining distances between points on the map, the combination of a frame having an opening therein through which a map is visible and over which the frame is centered, a glass face covering said opening, a beveled dial ring encircling said opening and bearing a series of successive numerals, a central post mounted in the glass face, a pointer arm having its shank pivotally mounted on said post, a semi-circular dial formed integral with the pointer arm and bearing a plurality of alphabets, a second pointer arm pivotally mounted on the first pointer arm midway of the ends of the semi-circular dial, said pointer arm having a downturned pointed end formed on said arm.

8. In a trail finder adapted to be placed over a map for determining distances between points on the map, the combination of a frame having an opening therein through which a map is visible and over which the frame is centered, a dial ring encircling said opening and bearing a series of successive numerals, a central post, a pointer arm having its shank pivotally mounted on said post, a semi-circular dial formed integral with the pointer arm and bearing a plurality of alphabets, a second pointer arm pivotally mounted on the first pointer arm midway of the ends of the semi-circular dial, said pointer arm having a sight opening positioned over the letters on the semi-circular dial and a downturned pointed end formed on said arm.

9. In a trail finder adapted to be placed over a map for determining distances between points on the map, the combination of a frame having an opening therein through which a map is visible and over which the frame is centered, a glass face covering said opening, a beveled dial ring encircling said opening and bearing a series of numerals, a central post mounted in the glass face, a pointer arm having its shank pivotally mounted on said post, a semi-circular dial constituting an extension of the pointer arm and bearing a plurality of alphabets, a second pointer arm pivotally mounted on the first pointer arm midway of the ends of the semi-circular dial, said pointer arm having a sight opening positioned over the letters on the semi-circular dial, and a downturned pointed end formed on said arm.

10. In a trail finder adapted to be placed over a map for determining distances between points on the map, the combination of a frame having an opening therein through which a map is visible and over which the frame is centered, a glass face covering said opening, a beveled dial ring encircling said opening and bearing a series of successive numerals, a central post mounted in the glass face, a pointer arm having its shank pivotally mounted on said post, a semi-circular dial formed integral with the pointer arm and bearing successive letters, a second pointer arm pivotally mounted on the first pointer arm midway of the ends of the semi-circular dial, said pointer arm having a downturned pointed end formed on said arm.

11. In a trail finder adapted to be placed over a map for determining distances between points on the map, the combination of a frame having an opening therein through which a map is visible and over which the frame is centered, a dial ring encircling said opening and bearing a series of numerals, a central post, a pointer arm having its shank pivotally mounted on said post, a semi-circular dial constituting an extension of the pointer arm and bearing a plurality of alphabets, a second pointer arm pivotally mounted on the first pointer arm midway of the ends of the semi-circular dial, said pointer arm having a sight opening positioned over the letters on the semi-circular dial and a downturned pointed end formed on said arm.

12. In a trail finder adapted to be placed over a map for determining distances between points on the map, the combination of a frame having an opening therein through which a map is visible and over which the frame is centered, a dial ring encircling said opening and bearing a series of numerals, a central post, a pointer arm having its shank pivotally mounted on said post, a semi-circular dial constituting an extension of the pointer arm and bearing successive letters, a second pointer arm pivotally mounted on the first pointer arm midway of the ends of the semi-circular dial, said pointer arm having a sight opening positioned over the letters on the semi-circular dial and a downturned pointed end formed on said arm.

MARVIN F. ZIEHM.